Nov. 22, 1927.
H. HOWARD
1,650,358
PROCESS AND APPARATUS FOR PRODUCING A GAS OF
UNIFORM SULPHUR DIOXIDE CONTENT
Filed Aug. 28, 1924
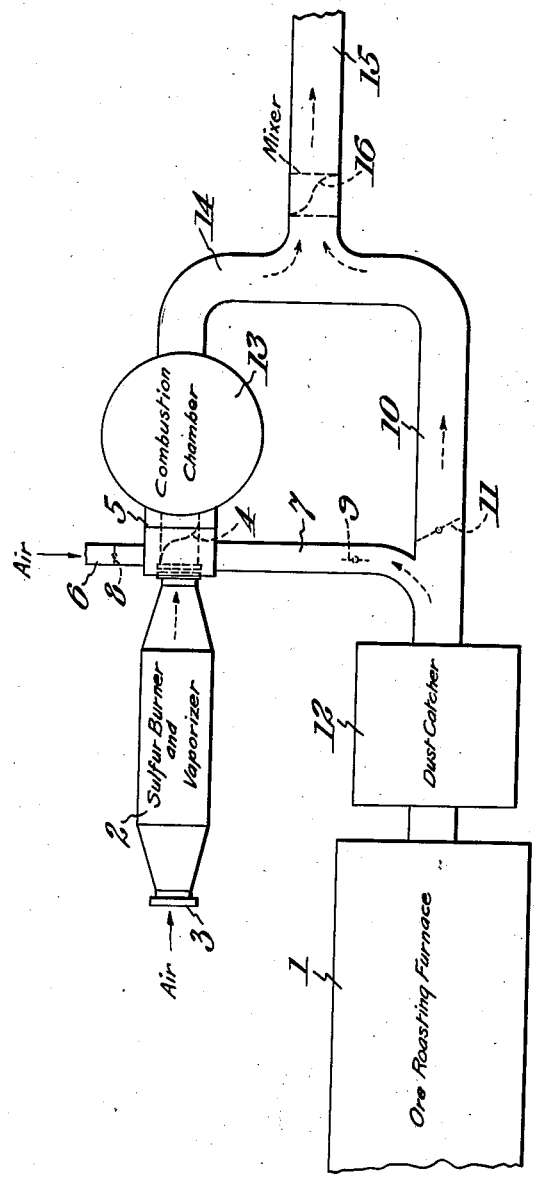
Inventor:
Henry Howard
By Byrnes Townsend & Bickenstein
his Attorneys Patented Nov. 22, 1927.

1,650,358

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS AND APPARATUS FOR PRODUCING A GAS OF UNIFORM SULPHUR-DIOXIDE CONTENT.

Application filed August 28, 1924. Serial No. 734,781.

The roasting of sulphid ore is carried out ordinarily in connection with the manufacture of sulphuric acid as a by-product from the sulphur dioxide containing gas produced. Among the difficulties encountered in the commercial operation of this process are those arising as a result of variations in the sulphur dioxide content of the gas. For instance, in the usual method of roasting zinc sulphid ore in a so-called Matthiessen and Hegeler kiln the ore is raked periodically at intervals of say 40 to 90 minutes and during each raking period the doors of the furnace must be held open thus admitting a large amount of air into the furnace which dilutes the sulphur dioxide content of the gas. When a raking operation is completed and the doors are closed the freshly raked ore burns very rapidly for a short time producing a relatively rich sulphur dioxide containing gas. Thus at each raking operation there is a large fluctuation in the sulphur dioxide content of the gas from normal to the minimum and then quickly to the maximum and then more slowly back to normal. Some fluctuations of course occur also in the operation of the furnace between rakings, for instance there is a gradual decrease in the sulphur dioxide content of the gas due to slower combustion of the ore as the interval between rakings passes. These fluctuations of the sulphur dioxide content of the gas interfere with the best operation of the sulphuric acid making process, and attempts have been made to avoid the fluctuations and to produce a gas of more nearly uniform sulphur dioxide content, but none of such attempts so far as I am aware have been commercially successful. Similar fluctuations occur in the sulphur dioxide content of the gases produced in other operations, for instance, in copper smelting and in the operation of Bessemer converters producing corresponding difficulties in or even making impractical the use of the sulphur dioxide content of such gases for the manufacture of sulphuric acid or other purposes.

My present invention relates to a process and an apparatus for the production of gas of substantially uniform and predetermined sulphur dioxide content from gases of variable sulphur dioxide content such as those produced by roasting sulphid ores, smelting operations and other chemical processes.

The process of my invention involves generally the provision of a supply of sulphur vapor and the burning of the vapor in the gas of variable sulphur dioxide content and in air in varying proportions depending upon variations in the sulphur dioxide content, so that a resulting gas of substantially uniform and predetermined sulphur dioxide content is produced.

The apparatus of my invention comprises in general a sulphur vaporizer, a source of gas of variable sulphur dioxide content, a burner, and means for regulating the supply of air and gas and sulphur vapors to the burner.

The invention will be described and illustrated in connection with a sulphur ore roasting furnace and the equalization of the sulphur dioxide content of the gas produced thereby, it being understood however that the sulphid ore roasting furnace merely represents any source of gas either variable or deficient or both with respect to its sulphur dioxide content.

Referring to the accompanying drawing, 1 represents an ore roasting furnace which may be a Matthiessen and Hegeler kiln or any other suitable type, and 2 represents a sulphur burner and vaporizer, for instance a Glens Falls rotary burner. In the normal operation of the Glens Falls burner the bulk of the elemental sulphur such as Louisiana brimstone supplied is first vaporized by the heat of combustion of a relatively small portion of it brought about by the injection of a limited supply of air at the front end of the burner, and the resulting gas carrying the vaporized sulphur is then mixed with air in a mixer at the rear end of the burner, and the resulting mixture burned. The quantity of sulphur vaporized may be varied by varying the quantity and temperature of the supply of air at the front end of the burner and the sulphur vapor producing capacity of the burner may be increased by jacketing it to prevent heat losses. My invention of course is not limited to the use of a Glens Falls burner. Any other source of sulphur vapor may be employed. 3 indicates the front end of the sulphur burner and 4 the mixer at the rear end thereof.

The mixer 4 is surrounded by the box 5 into which lead the pipes 6 and 7 controlled by valves 8 and 9. Pipe 6 is simply a connection to the outside air. Pipe 7 is a branch of the pipe 10, controlled by valve 11, leading from the dust catcher 12. The mixer 4 communicates with the combustion chamber 13 from which gas is delivered through pipe 14. Pipes 10 and 14 deliver into a single pipe 15 in which is located a mixer 16. The mixed gases in pipe 15 may be used for any purpose to which they are adapted, for instance, for the manufacture of sulphuric acid.

The operation of the apparatus is as follows: The sulphur burner 2 and the ore roasting furnace 1 are operated simultaneously and continuously. At times when the furnace is producing gas of the desired sulphur dioxide concentration the sulphur burner is operated in the usual well known way to produce a gas of the desired sulphur dioxide concentration and the resulting gases, the former after passing the dust catcher 12 and the latter after passing the combustion chamber 13, are united and mixed in the pipe 15. It is noted that the dust catcher 12 is not an essential part of the apparatus and forms no part of my present invention. The combustion chamber 13 is a device commonly employed in connection with sulphur burners to insure the complete combustion of vaporized sulphur and is not an essential part of my present invention. Under the conditions of operation referred to, valve 8 will be open to admit a supply of air to the mixer 4, and valve 11 will be open to permit the passage of gas from the furnace to the delivery pipe 15, and the valve 9 will be closed. Now if the gas produced by the furnace is deficient in sulphur dioxide as when air is admitted to the furnace during a raking operation, a suitable portion or all of it is by-passed through the pipe 7 to the box 5 where it is mixed in the mixer 4 with the gas carrying vaporized sulphur generated by the burner 2. In this way all or a part of the vaporized sulphur may be burned in the furnace gas instead of in air supplied through the pipe 6 and the sulphur dioxide content of the mixed gas in pipe 15 is thereby increased to the desired extent. In this case valve 8 will be adjusted to close or restrict the admission of air to the desired extent, valve 9 will be opened and valve 11 wholly or partially closed. If at another time the sulphur dioxide concentration of the gas in pipe 15 is too high, dilution may be accomplished by the admission of air by way of the pipe 6, the flow being simultaneously checked in pipe 7 and increased in pipe 10. In this manner a gas having a substantially uniform content of sulphur dioxide may be continuously obtained in pipe 15.

The furnace 1 and the sulphur burner 2 are proportioned in size and capacity so that the quantity of sulphur vaporized in the burner is sufficient when burned in the furnace gas to increase its sulphur dioxide content to the desired extent.

As will be apparent from the foregoing description, valves 8, 9 and 11 operate in cooperative relation, that is, as the valve 11 is closed to restrict the passage of gas through the pipe 10, the valve 9 is opened to permit a corresponding amount of gas to pass through pipe 7, and valve 8 is closed to cut off a corresponding amount of the air supply. Consequently the three valves may be connected to be operated in unison by the movement of a single operating device as a lever, and the operation of the three valves may be made automatic under the control of a known device sensitive to changes in the sulphur dioxide content of the furnace gases.

The process and apparatus may be operated as described not only for the purpose of equalizing fluctuations in the sulphur dioxide content of the furnace gas but also for increasing the average sulphur dioxide content of the gas. Thus there may be produced in accordance with my invention a gas having a sulphur dioxide content approaching that obtainable from an elemental sulphur burner with the use of only a part of the elemental sulphur equivalent of the resulting gas.

Another important feature of my process is that the operations for equalizing the sulphur dioxide content of the gas do not interfere with the roasting of the ore. In a known process of roasting sulphur ore and increasing the sulphur dioxide content of the gas, elemental sulphur is burned in the ore roasting furnace. This of course uses up the oxygen content of the air supply to the ore and interferes with the roasting thereof, whereas in my process the roasting of the ore is not affected by the operation for equalizing the sulphur dioxide content of the furnace gas. In roasting sulphid ore it is quite important to maintain a good draft on the furnace and particularly during the raking operation in order to prevent gassing, and it is therefore important to avoid any interference with the roasting operation. In my process the draft on the furnace is not interfered with and may be increased as much as is necessary to prevent gassing and any resulting deficiency of the sulphur dioxide content of the gas is made up by the burning of elemental sulphur vapor in the lean gas after it leaves the furnace.

Perhaps the most important feature of my process is that it provides for a very accurate regulation of the sulphur dioxide content of the gas produced. The sulphur burner provides and maintains a supply of sulphur in vapor form available for immediate use and any change in the sulphur dioxide content of the furnace gas is compensated almost instantaneously by adjustment of the valves 8, 9 and 11 as soon as a perceptible variation in the sulphur dioxide content of the gas occurs. There is no material time lag in the operation of the compensating step. Variations in the sulphur dioxide content of the furnace gas are detected at the source of the gas and the supply of vaporized sulphur is available immediately for compensating the variations.

I claim:—

1. Process for the production of gas of uniform sulphur dioxide content from gas of variable sulphur dioxide content which comprises mixing a portion of said gas of variable sulphur dioxide content in quantity inversely proportional to the sulphur dioxide content thereof with a supply of sulphur vapor, and burning the mixture.

2. Process for the production of gas of uniform sulphur dioxide content from gas of variable sulphur dioxide content which comprises mixing said gas of variable sulphur dioxide content with a stream of gas containing sulphur vapor in quantity sufficient when burned to give a gas of substantially uniform sulphur dioxide content, and burning the mixture.

3. Process for increasing the sulphur dioxide content of a gas containing sulphur dioxide below a requisite amount, which comprises generating a supply of sulphur vapor independently of the supply of said sulphur dioxide containing gas, mixing the sulphur vapor with the sulphur dioxide containing gas in quantities proportional to the deficiency of sulphur dioxide therein, and burning the mixture.

4. Process which comprises simultaneously and independently generating a supply of gas of variable sulphur dioxide content and a supply of sulphur vapor, mixing the sulphur vapor with a portion at least of said gas and with air in quantities together sufficient to burn the sulphur to sulphur dioxide, and burning the mixture.

5. Process which comprises simultaneously and independently generating a supply of gas of variable sulphur dioxide content and sulphur vapor, mixing the sulphur vapor with a portion at least of said gas and with air in quantities together sufficient to burn the sulphur to sulphur dioxide, burning the mixture, uniting the resulting gas with the remainder of said gas of variable sulphur dioxide content, and varying the proportions of air and of said gas of variable sulphur dioxide content mixed with said vapor with respect to variations in said sulphur dioxide content to give a resultant gas of predetermined sulphur dioxide content.

6. Process which comprises burning elemental sulphur in the presence of an excess thereof thereby producing a stream of gas containing sulphur dioxide and elemental sulphur vapor, mixing said stream of gas with a stream of air and with another stream of gas containing sulphur dioxide in varying amount, and burning the resulting mixture.

7. Process which comprises burning elemental sulphur in the presence of an excess thereof thereby producing a stream of gas containing elemental sulphur vapor, roasting a sulphid ore in a continuous manner thereby producing a stream of gas of variable sulphur dioxide content, mixing said stream of gas containing elemental sulphur vapor with a portion of said stream of gas of variable sulphur dioxide content and with air, burning the resulting mixture, and mixing the resulting gas with the remainder of said stream of gas of variable sulphur dioxide content, and varying the ratio of said stream of gas of variable sulphur dioxide content to air mixed with said stream of gas containing elemental sulphur vapor inversely with respect to variations in the sulphur dioxide content of said stream of gas of variable sulphur dioxide content.

8. In an apparatus for the production of gas of uniform sulphur dioxide content the combination of a source of gas of variable sulphur dioxide content, a sulphur vaporizer functionally independent of said source of gas, means for mixing a portion of gas from said source with vapors from said vaporizer, and means for burning the mixture.

9. In an apparatus for the production of gas of uniform sulphur dioxide content the combination of a source of gas of variable sulphur dioxide content, a sulphur vaporizer functionally independent of said source of gas, means for mixing a portion of gas from said source and air with vapors from said vaporizer, and means for burning the mixture.

10. Apparatus for the production of gas of uniform sulphur dioxide content comprising a source of gas of variable sulphur dioxide content, a sulphur vaporizer, means for mixing a portion of the gas from said source with vapors from said vaporizer, means for burning the mixture, and means for mixing the resulting gas with the remainder of the gas from said source.

11. Apparatus for the production of gas of uniform sulphur dioxide content comprising a source of gas of variable sulphur dioxide content, a sulphur vaporizer, means for mixing a portion of the gas from said source and air with vapors from said vaporizer, means for burning the mixture, means for mixing the resulting gas with the remainder of the gas from said source, and means for simultaneously varying the amount of air and the portion of the gas from said source mixed with said vapor.

12. Apparatus comprising an ore roasting furnace, a sulphur vaporizer, a sulphur vapor burner associated with said vaporizer, a valve controlled air supply to said burner, and a valve controlled conduit leading from said furnace to said burner.

13. Apparatus comprising an ore roasting furnace, a sulphur vaporizer, a sulphur vapor burner, means for supplying air to said burner, means for delivering gas from said furnace to said burner, a gas mixer, means for delivering gas from said burner to said mixer and means for delivering gas from said furnace directly to said mixer.

In testimony whereof, I affix my signature.

HENRY HOWARD